UNITED STATES PATENT OFFICE.

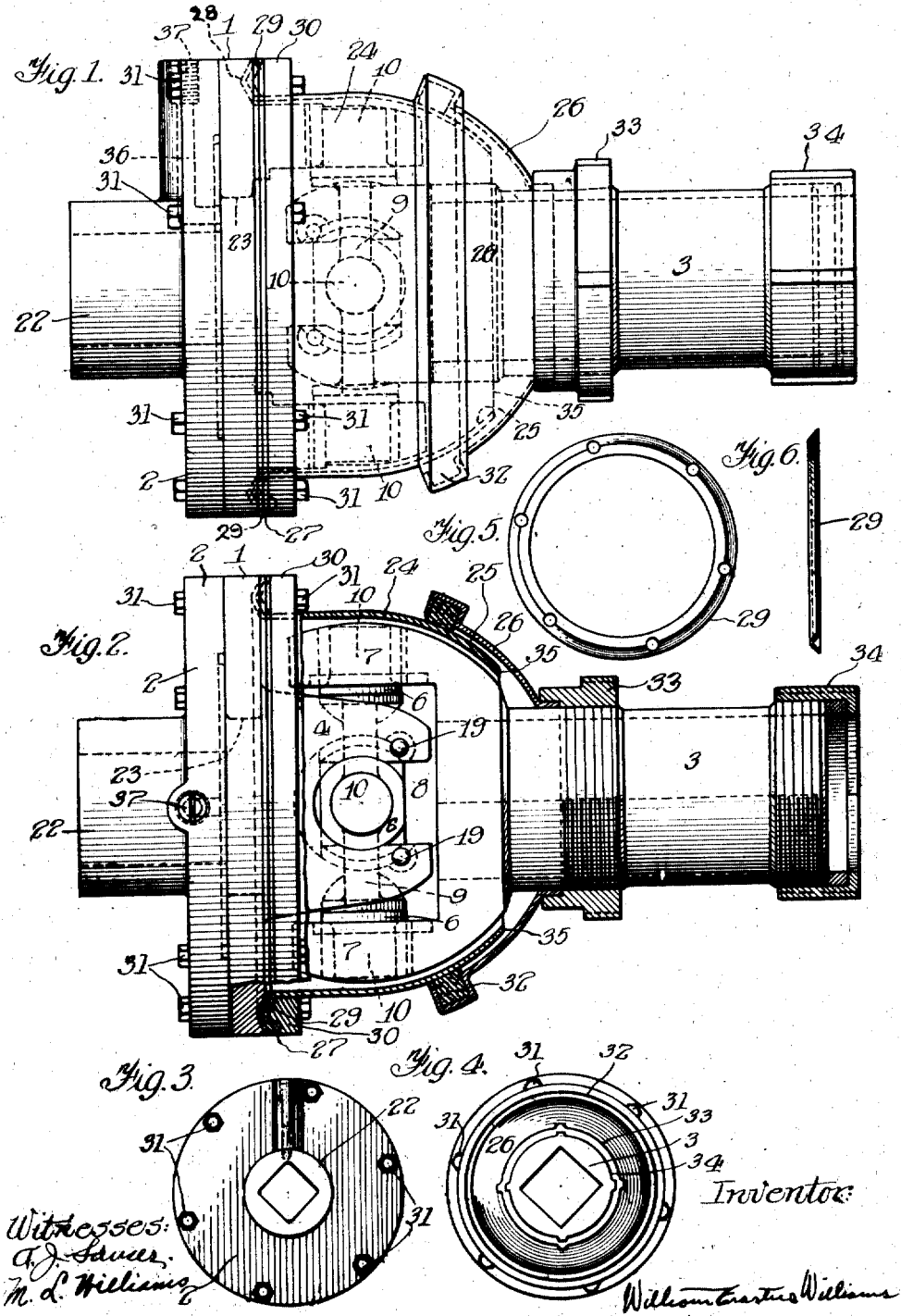

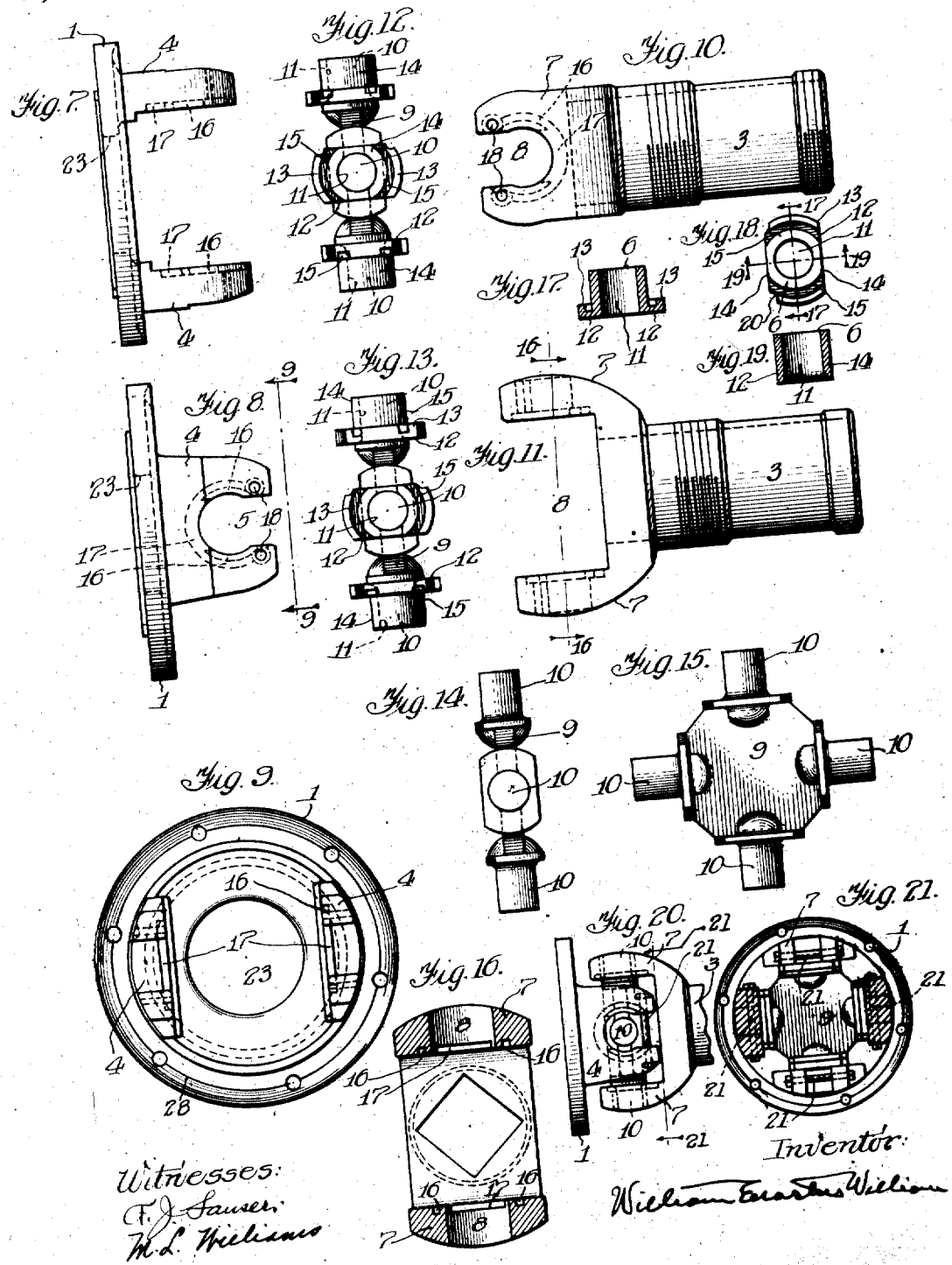

WILLIAM ERASTUS WILLIAMS, OF CHICAGO, ILLINOIS.

UNIVERSAL JOINT FOR POWER TRANSMISSION.

1,252,068.     Specification of Letters Patent.     Patented Jan. 1, 1918.

Application filed May 24, 1916. Serial No. 99,617.

*To all whom it may concern:*

Be it known that I, WILLIAM ERASTUS WILLIAMS, a citizen of the United States, residing at Chicago, county of Cook, and State of Illinois, have invented a new and useful Improvement in Universal Joints for Power Transmission, of which the following is a specification.

The object of my invention is to make a universal joint that will have a very small number of fitted parts and wearing surfaces and yet will be efficient and durable; and a further object is to improve the details of construction in such manner as to lessen the cost of assembling and making the parts and to save wear on the working surfaces, and to better protect the working parts from dust and dirt and conserve the oil or grease used with the joint for lubrication. The invention consists in the constructions set forth in the claims hereof.

Reference will be had to the accompanying drawings in which:

Figure 1 is a side elevation of the joint showing certain parts of the mechanism in dotted lines.

Fig. 2 is a view similar to Fig. 1 but showing the casing in section and the line of sight being at right angles to that of Fig. 1.

Fig. 3 is a view on a smaller scale showing the left end elevation of the devices of Figs. 1 and 2.

Fig. 4 is a view similar to Fig. 3 looking from the right end.

Fig. 5 is a view on a small scale of the plan of the gasket used.

Fig. 6 is an edge view of the devices of Fig. 5.

Fig. 7 is a side elevation of the main flange plate.

Fig. 8 is a plan view of the structure of Fig. 7.

Fig. 9 is an end view looking in the direction of arrows 9—9 of Fig. 8.

Figs. 10 and 11 are, respectively, a plan and an elevation of a sleeve yoke.

Fig. 12 is an edge view of the trunnion block with the bushings mounted thereon ready for assembly.

Fig. 13 is a view at right angles to that of Fig. 12.

Fig. 14 is a view similar to those of Figs. 12 and 13 showing the trunnion block before the bushings are placed on the trunnions.

Fig. 15 is a plan of the trunnion block.

Fig. 16 is a sectional view on line 16—16 of Fig. 11.

Fig. 17 is a transverse section through one of the bushings on line 17—17 of Fig. 18.

Fig. 18 is a plan of the parts seen in Fig. 17.

Fig. 19 is a transverse view on the line 19—19, Fig. 18.

Fig. 20 is a view analogous to Fig. 2, showing a modified form when the casing is removed.

Fig. 21 is a view partly in section on the line 21—21.

Besides simplicity of construction, lubrication and protection from dust, the most desirable feature in a joint is resistance to wear and severe shocks.

As relates to wear it is desirable to make the wearing parts so that they may be heat treated and hardened and yet be tightly fitted when assembled.

As to durability and shocks it is desirable to make the joint so that no loads will be transmitted between fitted parts in directions that tend to loosen the fitted joint, but rather to have all loads transmitted across solid metal to solid metal, which when first made to right size will not tend to become loose excepting by natural wear.

I accomplish these desirable features by the constructions shown.

In the drawings 1 indicates a flange yoke, 2 its companion flange and 3 a sleeve yoke.

The flange yoke 1 is provided with horns 4 which support in holes 5 the bearing bushings 6. Similar horns 7 on the sleeve yoke 3 are provided with holes 8 that support another set of bushings 6.

The yokes 1 and 3 are connected through the bushings 6 to a trunnion block 9 provided with trunnion bearings or journals 10 integral with the block as it is made of a drop forging in one piece having the trunnions turned on the four corners.

The bearing bushings 6 are shown in detail in Figs. 17, 18 and 19 and are provided with bearing holes 11 and segments of curved flanges 12 at the base. The flanges 12 have ribs 13 on their outer margins. The sides of the bushings are cut off as is indicated by 14.

The holes 5 and 8 in the horns are made just wide enough across the entrance to admit the bushings on the short diameter; and the main body of the hole is made circular of the same diameter as the curved ends 15 of the bushings, and on the inside of the horns there is a circular groove 16 adapted to fit the ribs 13 of the bushings. Notches 17 are cut out at the back of the holes 5 and 8 just the depth of the ribs 13 to permit the entry of the ribs in assembling the parts.

When the parts are to be assembled the bushings 6 are placed on the trunnions 10 in the positions shown by Figs. 12 and 13 at a time when the flange and sleeve yokes are in relative positions as shown by Figs. 7 and 10 and 8 and 11, then the parts are pushed together entering the bushings to their respective holes in the horns while their long diameters are lying in the axis of the parts. After the bushings are entered, they are revolved 90 degrees which brings the long diameters to fit the circular part of the holes 5 and 8 and makes a secure fit in the directions of the thrusts of the parts in use.

When the bushings are seated in the horns they are secured against rotation by means of two small rivets 19 passing through holes 18 in the horn ends and alongside the flanges 12 of the bushings in the little recesses 20.

In place of the rivets 19 I may use any other suitable means for securing the bushings from rotative displacement. In Figs. 20 and 21 I show small bolts or screws 21 extending across the open ends of the horns and while they secure the bushings in place they also tie across the open ends of the horns.

The ribs 13 on flanges 12 of the bushings tie across the openings 5 and 8 and aid in strengthening the parts when assembled.

The companion flange 2 is simply the means of connecting the shaft on that side by means of the socket 22 into which the shaft is fixed and the flange also closes the open end 23 of the flange yoke 1.

Lubrication of working parts like joints is somewhat troublesome since the centrifugal action in running throws out the lubricant from the wearing surfaces and through the seams of the vessel holding the lubricant. To hold in the lubricant it is common to inclose the joint in a casing somewhat similar to what I use but differing in details. The inside casing is indicated by 24 which has a hemispherically shaped end 25 working in an outside shell or cup 26. The shell 24 is provided with a flange 27 shaped to fit into a V-shaped groove 28 in the flange yoke 1. Between the groove 28 and the flange 27 I place a gasket 29 composed of any suitable material. Since the casing 24 is made of thin metal and it is necessary to have a very tight fit along the joint of the flange 27 I provide a reinforcing ring 30 back of the flange which enables the bolts 31 to hold the gasket joint tight.

The outside casing 26 is provided with a packing ring 32 and the casing 26 itself is held in place by the lock nut 33 which is screwed on to the sleeve yoke. A suitable dust cap and packing are provided at the end as indicated by 34.

The centrifugal pressures developed in running are so great sometimes that almost no jointed seam of ordinary construction will securely retain the oil or grease used in these joints and generally the lubricant that is placed in the casing will not long remain in quantity more than what will fill the annular space between the limits of the hole 23 and the opening 35, the centrifugal action holding out into that space the lubricant which is ordinarily more or less stiff grease.

Heretofore it has been the practice to provide a hole in the casing 24 closed with a screw cap to allow means for filling the casing with grease. This hole is usually a source of escape for the grease under centrifugal pressure since the screw threads do not usually fit tightly. In place of making a hole in the thin wall of casing 24, I provide a hole 36 in the companion flange which is closed by a screw 37. The hole extends down below the edge of and into aperture 23 of flange yoke 1, thus bringing the inside of the orifice within the opening or diameter 35 of the casing so that even if the screw 37 is not tight the centrifugal action cannot act to drive the lubricant that way beyond the small diameter of hole 23.

I aim by means of my gasket 29 and reinforcing ring 30 to make the casing so tight against centrifugal discharge of the lubricant that I will retain a sufficient quantity for a much longer time than has heretofore been possible.

What I claim is:

1. In a device of the class described, a driving yoke, a trunnion block, a driven yoke, and bearing bushings connecting the yokes and block and serving as journals for the trunnions, said bushings being circular in cross section but flattened on two sides, said yokes being provided with openings adapted to receive and closely embrace the curved surfaces of the bushings, but open on one side so far as to allow the flattened bushings to enter when properly turned, whereby the parts may be assembled by longitudinal movement when the bushings are seated on the trunnions, and when home, the bushings may be revolved locking the parts together.

2. In a device of the class described, the combination with a driving yoke, a transverse block, and a driven yoke, of bearing bushings inserted in the yokes as journals for the trunnions, respectively, the bushings being primarily circular in cross section and flattened on two opposite sides, and said yokes being provided with recesses in which the bushings fit and which have on one side an opening equal in width to the distance between the flattened sides of the bushings, whereby the bushings seated on the trunnions may be properly turned, passed laterally into their recesses in the yokes, and turned to prevent withdrawal.

3. In a device of the class described, a driving yoke, a trunnion block, a driven yoke and bearing bushings connecting the trunnions to the yokes, said bushings being of general cylindrical form but flattened on two sides and provided with circular ribbed flanges on their bases, said yokes being provided with holes cylindrical in form and adapted to fit closely the cylindrical surface of the bushings, and having on one side an opening equal in width to the distance between the flattened sides of the bushing and with circular grooves adapted to register with the circular ribs on the bushings whereby a tie is formed across said holes.

4. In a device of the class described, a driving yoke, a trunnion block, a driven yoke and bearing bushings connecting the trunnions to the yokes, said bushings being of general cylindrical form but flattened on two sides and provided with circular ribbed flanges on their bases, said yokes being provided with cylindrical holes adapted to fit the cylindrical surface of the bushings, and open at one side to a width equal to the distance between the flattened sides of the bushings and with circular grooves adapted to register with the circular ribs on the bushings whereby a tie is formed across said holes; and means for locking the bushings against rotation.

5. The combination with two yokes provided with trunnion-receiving openings, of a block provided with trunnions smaller than said openings, and non-cylindrical sleeves mounted on the trunnions respectively and adapted to be secured in said openings by rotation upon their trunnions.

6. The combination with two yokes provided with trunnion-receiving openings, of a trunnion block having its trunnions smaller than said openings, non-cylindrical bushings mounted in said openings, encircling the trunnions, respectively, and provided at their inner ends with flanges to resist radial displacement.

7. The combination with two yokes provided with trunnion bushing openings and with flange-receiving recesses, of a trunnion block having trunnions smaller than said openings, externally flattened trunnion bushings mounted on the trunnions, fitting as to non-flattened portions in said openings, and provided with flanges to engage in said recesses, resisting radial displacement and strengthening the yokes.

8. In a device of the class described, a driving yoke, a trunnion block, a driven yoke, and bearing bushings connecting the parts, said bearing bushings being circular in cross section but flattened on the sides and provided with ribbed flanges, and said yoke being provided with holes of circular cross section and with circular grooves adapted to receive the ribs of said flanges, substantially as set forth.

9. In devices of the class described, the combination with driving and driven yokes each having a hole of cylindrical cross section laterally opened by a slot, in its wall, of a width less than the diameter of the hole, of a trunnion block with trunnions smaller than said holes, bearing bushings mounted on the trunnions, respectively, fitting in said holes, but flattened to allow them to enter said slots, and means for locking the bushings when so entered and turned into position transverse to the slots.

10. In a device of the class described, the combination with a driving yoke and a driven yoke provided with trunnion holes of circular cross section, each laterally opened by a slot of a width less than the diameter of the hole, of a trunnion block having trunnions smaller than said holes, bushings mounted on the trunnions, fitting said holes, and flattened to enter said slots when properly turned, and insertible bodies locking the bushings against rotation.

11. In a device of the class described, the combination with driving and driven yokes provided with trunnion holes of circular cross section each having its wall cut away on one side to form a slot of a width less than the diameter of the hole, of a block having trunnions smaller than said holes, bushings mounted on the trunnions, respectively, primarily fitting the corresponding holes but flattened to permit them to pass through said slots, and members extending across the bushing seats to lock the bushings against rotation.

12. In a device of the class described, a driving yoke, a trunnion block, a driven yoke and bearing bushings connecting the parts, said yokes being provided with seats open to receive the bushings when they are in place on their trunnions, the parts being assembled and being so shaped that partial rotation of the bushings locks them in place.

13. In a device of the class described, a driving yoke, a trunnion block, a driven yoke and bearing bushings connecting the parts, said yokes being provided with seats open to receive the bushings when they are in place on their trunnions, the parts being assembled and being so shaped that partial rotation of the bushings locks them in place, with means for locking the bushing from rotation when adjusted.

14. In a device of the class described, a driving yoke, a trunnion block, a driven yoke and bearing bushings connecting the parts, said yokes being provided with seats open to receive the bushings when they are in place on their trunnions, the parts being assembled and being so shaped that partial rotation of the bushings locks them in place, and means extending across the bushing seats for locking the bushings against displacement.

15. In a device of the class described, a driving yoke, a trunnion block, a driven yoke and bearing bushings connecting the parts, said bushings being circular in cross section but flattened on the sides and provided with ribbed flanges, said yokes being provided with seats for the bushings and their ribbed flanges, but laterally open to allow entrance of the flattened bushings when properly turned, said bushings being adapted to revolve in the seats in the yoke and thereby engage the flanges of the bushings in a position binding across the sides of the seats.

16. In a device of the class described, a driving yoke, a trunnion block, a driven yoke and bearing bushings connecting the parts, said bushings being circular in cross section but flattened on the sides and provided with ribbed flanges, said yokes provided with seats circular in cross section for the bushings and their ribbed flanges, but laterally open to allow the entrance of the flattened bushings when properly turned, said bushings being adapted to revolve in said seats in the yokes and thereby engage the flanges of the bushings in a position binding across the sides of the seats; with means for locking the bushings in said binding positions.

Signed at Chicago, in the State of Illinois and county of Cook, this 20th day of May, 1916.

WILLIAM ERASTUS WILLIAMS.

Witnesses:
M. L. WILLIAMS,
H. MILLER.